United States Patent [19]
Irlam et al.

[11] 3,861,926
[45] Jan. 21, 1975

[54] GLASS FIBER COMPOSITIONS OF $R_2O\text{-}RO\text{-}ZRO_2\text{-}SIO_2$

[75] Inventors: Phillip Sidney Irlam, Southport; Brian Yale, Upholland, near Wigan, both of England

[73] Assignee: Pilkington Brothers Limited, Lancashire, England

[22] Filed: Nov. 10, 1972

[21] Appl. No.: 305,395

Related U.S. Application Data

[63] Continuation-in-part of Ser. No. 58,643, July 27, 1970, abandoned.

[30] Foreign Application Priority Data
July 28, 1969 Great Britain .................. 37862/69

[52] U.S. Cl. ..................... 106/50, 106/52, 106/54, 106/99
[51] Int. Cl. ............................................. C03c 13/00
[58] Field of Search ......................... 106/50, 52, 54

[56] References Cited
UNITED STATES PATENTS

| | | |
|---|---|---|
| 2,566,134 | 8/1951 | Mockrin et al. ................. 106/52 |
| 2,640,784 | 6/1953 | Tiede ................................. 106/50 |
| 3,007,806 | 11/1961 | Hartwig ........................... 106/50 |
| 3,060,041 | 10/1962 | Loewenstein .................... 106/50 |
| 3,485,702 | 12/1969 | Mochel .......................... 106/52 X |
| 3,499,776 | 3/1970 | Baak et al. ........................ 106/54 |
| 3,783,092 | 1/1974 | Majumdar ...................... 106/50 X |

FOREIGN PATENTS OR APPLICATIONS

| | | | |
|---|---|---|---|
| 1,243,793 | 8/1971 | Great Britain | |
| 684,898 | 1/1969 | South Africa | |
| 727,779 | 11/1942 | Germany | 106/50 |
| 147,297 | 10/1962 | U.S.S.R. | 106/52 |
| 1,544,960 | 9/1968 | France | 106/52 |
| 249,577 | 12/1969 | U.S.S.R. | 106/50 |
| 808,754 | 7/1951 | Germany | 106/54 |
| 7,011,037 | 2/1971 | Netherlands | 106/50 |

OTHER PUBLICATIONS

Kozmin, M. I., Glass & Ceramics, Vol. 17 (1960–1961) pp. 561–563, "Continuous Process for Melting and Conditioning High Zircon Glass," Nov. 1960.

Volf, Technical Glasses, London (1961) p. 120.

*Primary Examiner*—Helen M. McCarthy
*Attorney, Agent, or Firm*—Sughrue, Rothwell, Mion, Zinn & Macpeak

[57] ABSTRACT

A glass composition for forming glass fibers to be used as reinforcement for cementitious products comprises in molecular weight percentages $SiO_2$ 62% to 75%, $ZrO_2$ 7% to 11% alkali metal oxide 13% to 21%, alkaline earth metal oxide 1% to 10%, and optionally a small percentage of $Al_2O_3$, $B_2O_3$, $Fe_2O_3$, $CaF_2$ or $TiO_2$.

4 Claims, 15 Drawing Figures

GLASS FIBER COMPOSITIONS OF $R_2O$-$ROZRO_2$-$SIO_2$

BACKGROUND OF THE INVENTION

This application is a continuation-in-part of our Application Ser. No. 58643 filed July 27, 1970 (now abandoned).

FIELD OF THE INVENTION.

This invention relates to glass compositions for forming glass fibres which are to be incorporated as reinforcement in cementitious products.

DESCRIPTION OF THE PRIOR ART.

It has been proposed to use glass fibres for reinforcing cementitious products, but it has been found that the highly alkaline nature of the cement, particularly ordinary Portland cement, causes the glass fibres to be rapidly attached and weakened or disintegrated, if they are made of glasses of the compositions generally used for fibre production, such as that known as E-glass. In consequence, although the glass fibre reinforced cementitious products have a high initial strength, they are soon reduced to a relatively weak condition as much of the added strength due to the glass fibres is lost.

It has been proposed in British Pat. No. 1,200,732 to use alkali-resistant glass compositions from which fibres could be made which would not lose their strength from attack by the alkali in cement. Various alkali-resistant glass compositions are known and used in other fields, such as laboratory glassware and boiler gauge glasses, but the problems arising in the field of glass fibre reinforcement for cement are particularly difficult. Firstly, the fibres must be of the "continuous" type, which means that in production they must be drawn continuously from a bushing. Such bushings are commonly made of platinum or platinum alloy, but in order that they may have a sufficient life to make production commercially attractive, the working temperature should not exceed 1,320°C. If the working temperature does exceed 1,320°C, the bushings are subject to wear and distortion at such a rate that replacement becomes necessary after a relatively short period, thus raising the production cost. This working temperature, at which the fibres are drawn from the bushing, is determined by the viscosity of the particular glass composition, which falls as the temperature rises and which must be approximately 1,000 poises for the production of satisfactory glass fibres. Thus the glass composition should be so selected as to have a viscosity of 1,000 poises at a temperature of 1,320°C or below, this temperature being the working temperature $T_w$.

As the glass fibres leave the bushing, they cool rapidly due to their high surface area. In order to avoid crystallisation and consequent weakening or fracture of the fibres, it is necessary that the liquidus temperature of the glass should be at least 40°C below the working temperature, so that the glass reaches a relatively viscous state before it reaches the liquidus temperature and crystallisation is therefore much retarded if not stopped altogether.

The combination of these required characteristics, namely a working temperature ($T_W$) at which the viscosity is 1,000 poises which does not exceed 1,320°C, and a liquidus temperature ($T_L$) which is at least 40°C less than $T_W$, is extremely difficult to achieve in a glass which has sufficient alkali resistance to withstand the alkaline environment in cement.

It is known that zirconia ($ZrO_2$) improves the alkali resistance of glass, but it also increases the melting temperataure and the viscosity. Zirconia-containing glass fibres of the order of 2.5 inches in length have been successfully used as reinforcement in cement, as described in British Pat. No. 1,243,972, but they have required a working temperature of around 1,450°C to 1,500°C, which shortens the life of the platinum bushings to such an extent as to raise the production cost of the fibres to a level at which marketing is difficult.

SUMMARY OF THE INVENTION

We have now discovered a range of zirconia-containing glasses, with sufficiently high contents of zirconia to provide good resistance to alkalis, which by careful restriction of the other constituents which make for high viscosity can be given a working temperature of 1,320°C or below. Further, by careful investigation of the liquidus curves, these glasses can be selected to have a liquidus temperature 40°C or more below the working temperature.

According to the invention a glass composition for forming glass fibres which are to be incorporated as reinforcement in cementitious products consists essentially of, in molecular weight percentages:

| | |
|---|---|
| $SiO_2$ | 62% to 75% |
| $ZrO_2$ | 7% to 11% |
| $R_2O$ | 13% to 21% |
| $R'O$ | 1% to 10% |
| $Al_2O_3$ | 0% to 4% |
| $B_2O_3$ | 0% to 6% |
| $Fe_2O_3$ | 0% to 5% |
| $CaF_2$ | 0% to 2% |
| $TiO_2$ | 0% to 4% | wherein $R_2O$ represents $Na_2O$ and up to 2 mol % $Li_2O$, and $R'O$ is an oxide selected from the group consisting of the alkaline earth metal oxides, zinc oxide (ZnO) and manganese oxide (MnO), the balance if any consisting of other compatible constituents, and wherein the maximum value of the molecular weight percentage represented by $SiO_2 + ZrO_2 + AlO_{1.5}$ is on a sliding scale dependent on the content of $ZrO_2$, ranging in the absence of $Li_2O$ and $CaF_2$ between 78.5% when $ZrO_2$ is 11% and 81% when $ZrO_2$ is 7%, and being increased over the whole scale by 1.5% when 2% $Li_2O$ is present and being further increased over the whole scale by 2% when 2% $CaF_2$ is present, the composition also being such that the liquidus temperature $T_L$ is more than 40°C below the temperature $T_W$ at which the glass viscosity is 1,000 poises.

Glasses falling within the above stated range of compositions have a viscosity of 1,000 poises at or below 1,320°C, and can be fiberized at or below that temperature without serious risk of crystallisation of the fibres.

The molecular weight percentage of alumina is calculated on the basis of the formula $AlO_{1.5}$ because one atom of aluminium replaces one atom of silicon, so it is the number of atoms of aluminium which is relevant rather than the number of molecules of $Al_2O_3$.

Fluorine replaces oxygen in the atomic network of the glass. Although it is added in the usual way as a fluoride of one or more of the elements whose oxides are listed above, e.g., Ca or Na, it cannot be allotted to any one element as a fluoride in the final glass composition. It is convenient to express the fluorine content of the composition in terms of $CaF_2$, for example, but the amount of CaO shown must then be reduced to allow for the amount of Ca included as the fluoride.

The R'O content preferably consists of from 2% to 8% CaO.

Further according to the invention there are provided particular glass compositions consisting of, in molecular weight percentages:

| | |
|---|---|
| $SiO_2$ | 69% to 70% |
| $ZrO_2$ | 9.5% |
| $Na_2O$ | 14.5% to 15.5% |
| $Li_2O$ | 2% |
| CaO | 2% |
| $CaF_2$ | 0% to 1% |
| $TiO_2$ | 2% |

DESCRIPTION OF THE PREFERRED EMBODIMENTS

Figure 1:
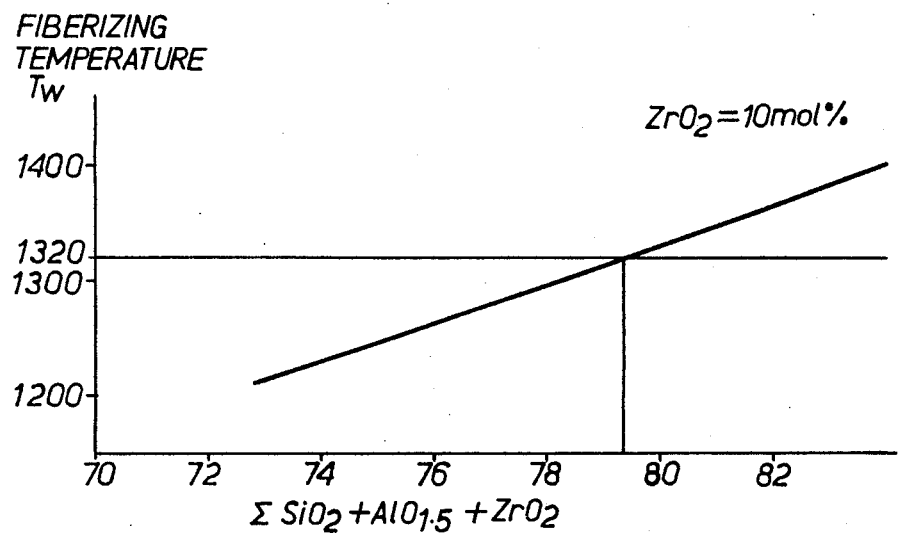
FIG. 1 is a graphical representation of the variation in fiberizing temperature $T_W$ with variation in the sum of $SiO_2 + ZrO_2 + AlO_{1.5}$, for glasses containing 10 mol % $ZrO_2$.
Figure 2:
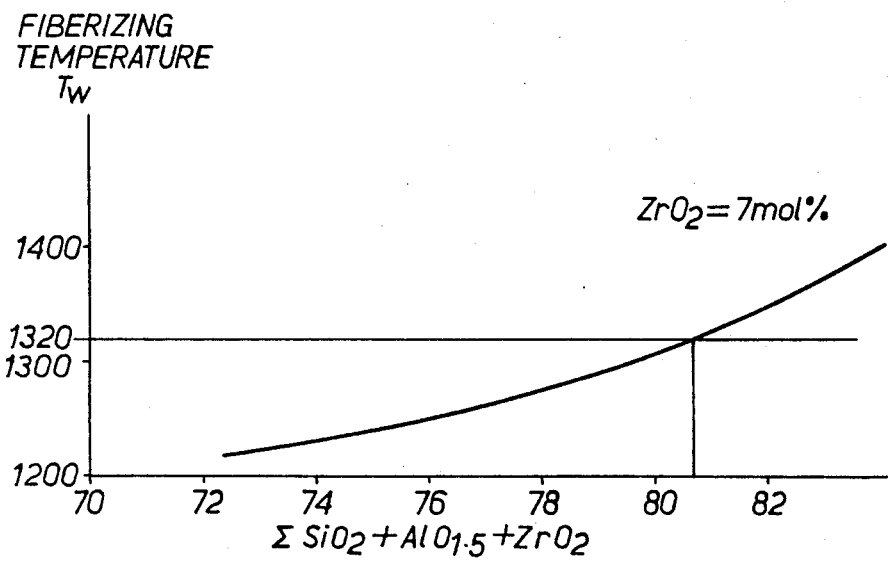
FIG. 2 is a similar graph for glasses containing 7 mol % $ZrO_2$.
Figure 3:
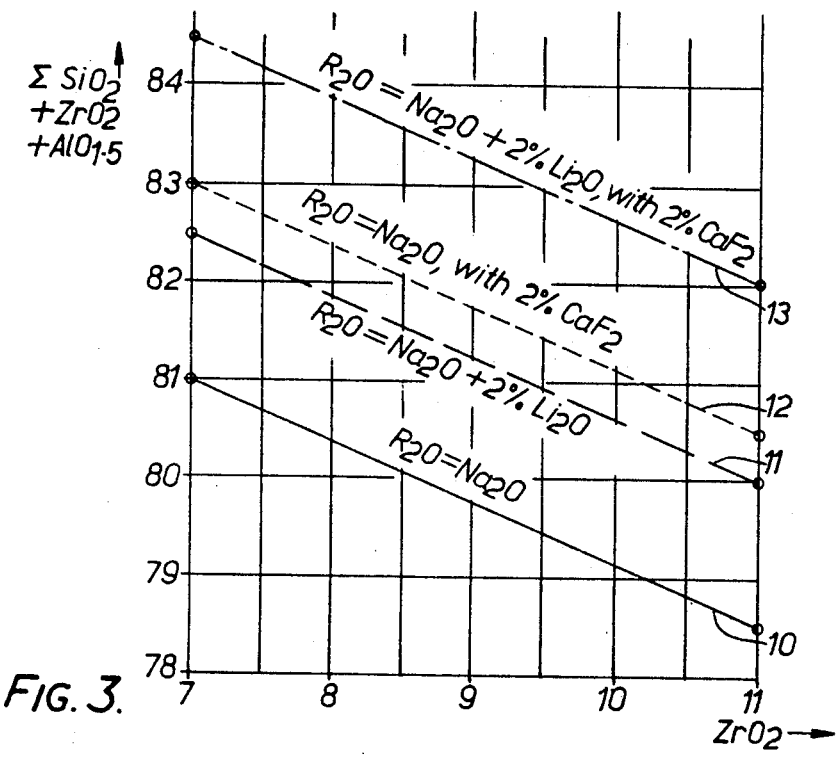
FIG. 3 is a graphical representation of the permitted variation of the sum of $SiO_2 + ZrO_2 + AlO_{1.5}$.
Figure 4:
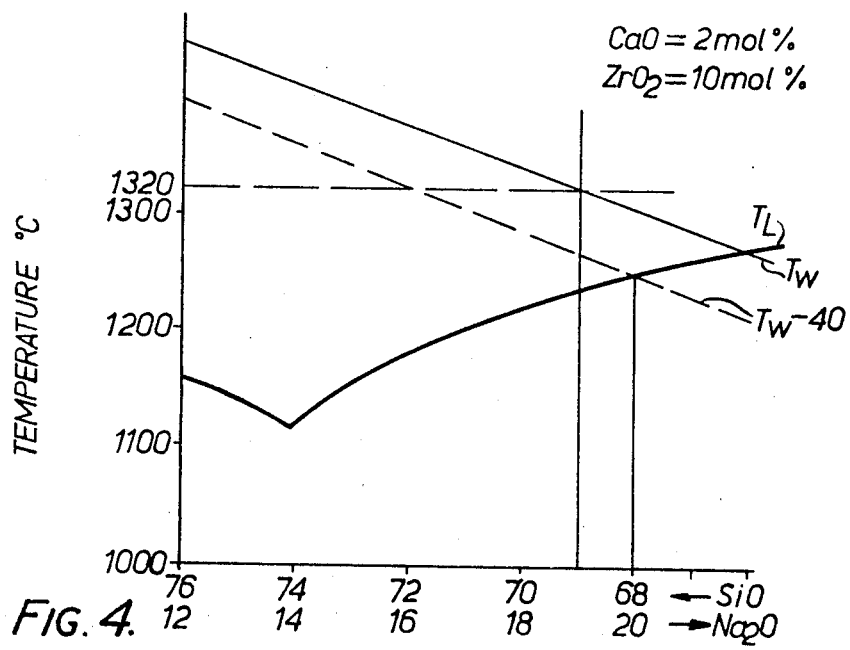
FIG. 4 is a graphical representation of the variation of the fiberizing temperature $T_W$, at which the glass viscosity is 1,000 poises, and the liquidus temperature $T_L$, for a range of glass compositions all containing 10 mol % $ZrO_2$ and 2 mol % CaO with the balance consisting of inversely varying molar proportions of $SiO_2$ and $Na_2O$, and illustrating the narrow range of such glasses which are suitable for commercial fiberizing, in accordance with the invention.
Figure 5:
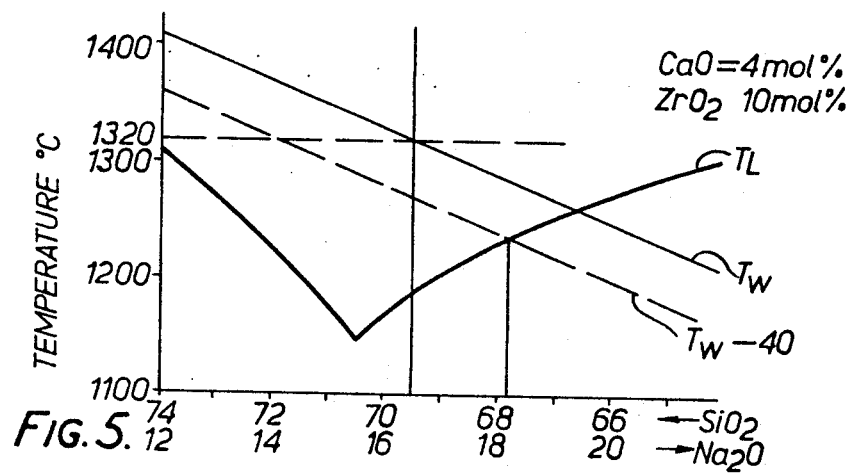
FIGS. 5 to 11 are similar graphical representations for different ranges of compositions, differing from that of FIG. 4 in the fixed amounts of $ZrO_2$ and CaO as indicated in the respective Figures.
Figure 6:
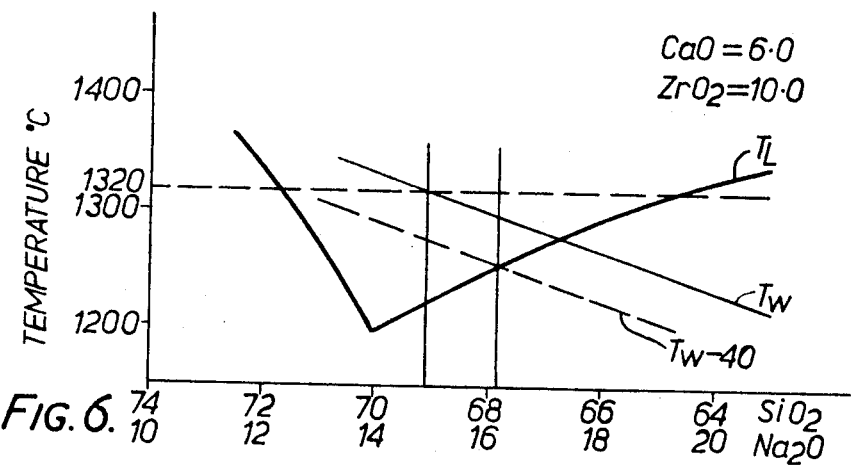
Figure 7:
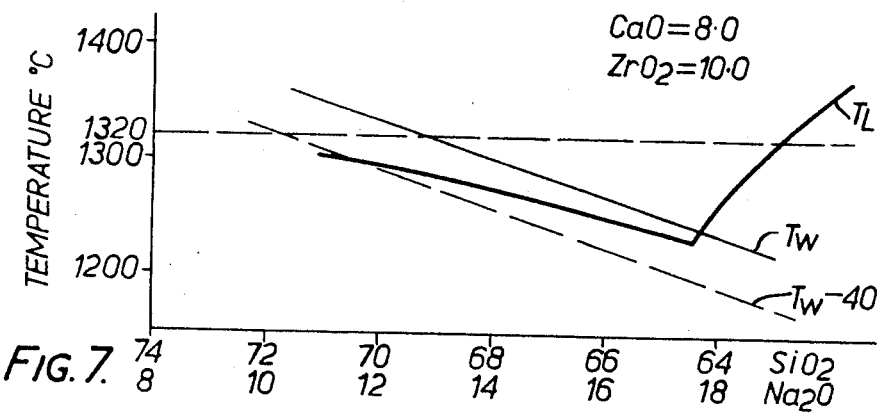
Figure 8:
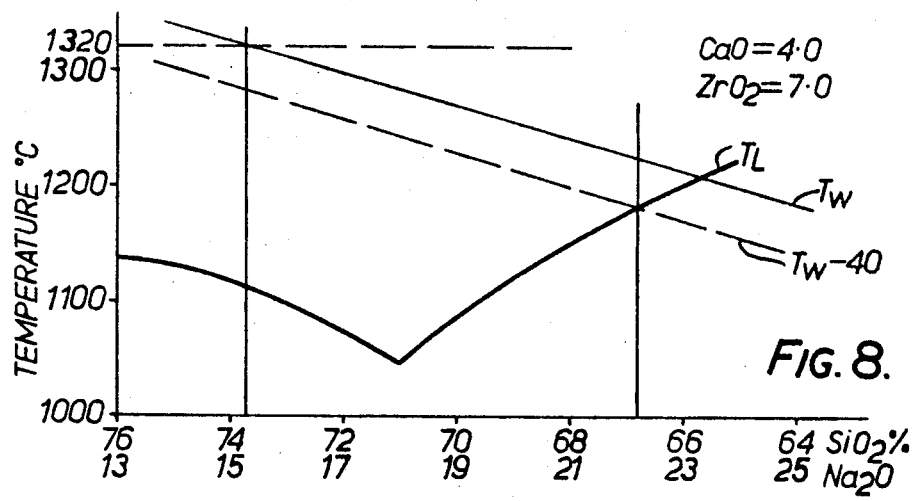
Figure 9:
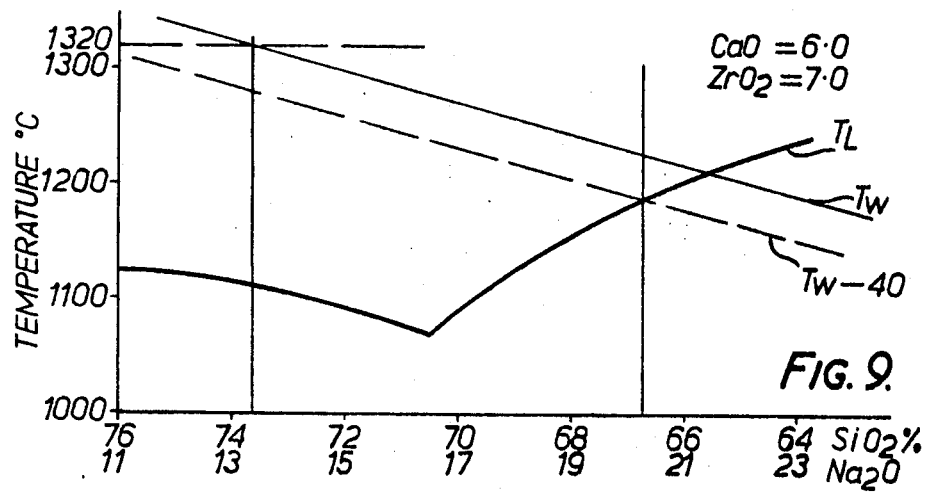
Figure 10:
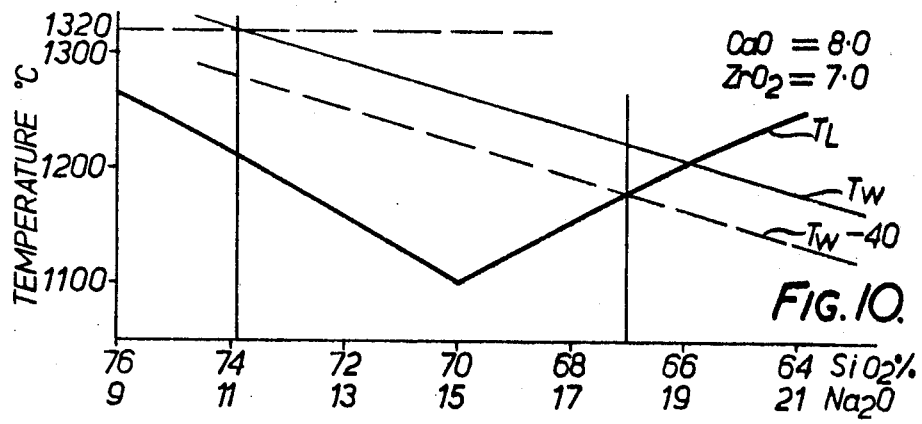

As explained above it is necessary that the working temperature $T_W$ (i.e., the temperature at which the viscosity is 1,000 poises) should be kept below 1,320°C. The viscosity is largely dependent on the $ZrO_2$ content and on the value of the molecular weight percentage represented by $SiO_2 + ZrO_2 + AlO_{1.5}$, as can be seen from FIGS. 1 and 2. which illustrate graphically the increase in $T_W$ with increase of the sum of $SiO_2 + ZrO_2 + AlO_{1.5}$, firstly for a $ZrO_2$ content of 10 mol % (FIG. 1) and secondly for a $ZrO_2$ content of 7 mol % (FIG. 2). It will be seen that with 10 mol % $ZrO_2$ $T_W$ reaches the limiting figure of 1,320°C at the point where the sum of $SiO_2 + ZrO_2 + AlO_{1.5} = 79.3$ mol %, whereas with 7 mol % $ZrO_2$ the limiting figure is not reached until $SiO_2 + ZrO_2 + AlO_{1.5}$ is nearly 81 mol %. Thus, as the $ZrO_2$ content is increased, the maximum permitted figure for $SiO_2 + ZrO_2 + AlO_{1.5}$ must be decreased on a sliding scale in order to keep the viscosity and hence the working temperature $T_W$ down to acceptable figures. In FIG. 3, line 10 shows the maximum permitted values of $SiO_2 + ZrO_2 + AlO_{1.5}$ for the case where $R_2O = Na_2O$ alone. The maximum permitted value varies from 81% when $ZrO_2 = 7\%$, down to 78.5% when $ZrO_2 = 11\%$. Slight variations from the values indicated by FIG. 3 may occur if the CaO content is varied inversely with the $Na_2O$ content, increasing CaO generally making the glass a little more viscous, but the relationship is not simple and the variations from the indicated values are slight.

The addition of $Li_2O$ helps to reduce the viscosity, and line 11 shows how the inclusion of 2% $Li_2O$ in the $Rr_2O$ component enables the maxima to be raised by 1.5% all along the scale, i.e., from 82.5% when $ZrO_2$ is 7%, to 80% when $ZrO_2$ is 11%. However, $Li_2O$ is an expensive raw material. The cheapest and most convenient source of $Li_2O$ also contains $Al_2O_3$, which must be kept low, so the practical upper limit for $Li_2O$ is 2 mol %.

Fluorine also acts as a flux to aid melting and reduce viscosity and lines 12 and 13 show how the addition of 2% $CaF_2$ enables the maxima to be raised by 2% all along the scale. Line 12 refers to the case where $R_2O = Na_2O$ alone and line 13 refers to the case where $R_2O = Na_2O + 2\%$ $Li_2O$, this latter permitting the highest maxima for $SiO_2 + ZrO_2 + AlO_{1.5}$ of 84.5% when $ZrO_2 = 7\%$ dropping to 82% when $ZrO_2 = 11\%$.

In addition to the need for keeping the working temperature $T_W$ at or below 1,320°C, it is necessary that the liquidus temperature $T_L$ should be at least 40°C below $T_W$, as explained above, to reduce the danger of crystallisation occurring in the glass fibres as they are cooled down after leaving the platinum bushing. With the glass compositions falling within the broad range defined above, the liquidus temperature generally shows a minimum at a particular molar ratio of $SiO_2$: $Na_2O$, which depends on the other constituents but is around 5:1. Above and below this ratio, the liquidus temperature increases and, with lower proportions of $SiO_2:Na_2O$, $T_L$ may exceed $T_W$, thus rendering the glass compositions unsuitable for fiberizing due to the danger of crystallisation.

FIGS. 4 to 11 inclusive illustrate the variation of $T_W$ and $T_L$ with varying molar ratios of $SiO_2:Na_2O$ in a number of different glass compositions consisting of $SiO_2$ and $Na_2O$, varied inversely to one another, and fixed proportions of $ZrO_2$ and CaO. In each Figure a line has also been drawn for $T_W-40°C$. Vertical lines have been drawn in each case through the point where $T_W = 1,320°C$, which generally defines the upper limit of the $SiO_2$ content, and through the point where $T_L = T_W-40°C$, which generally defines the lower limit of the $SiO_2$ content. The sum of $SiO_2 + ZrO_2$ at the upper limit ($Al_2O_3$ being absent) will be seen in each case to coincide with the maximum figure indicated by FIG. 1. It is only in the region between the two vertical lines on each of FIGS. 4 to 11 that the glass composition is commercially suitable for fiberizing.

FIGS. 4 to 7 relate to glasses containing 10 mol % $ZrO_2$ and 2, 4, 6 and 8 mol % CaO, in addition to inversely varying amounts of $SiO_2$ and $Na_2O$. As the CaO content is increased, $T_W$ shows no marked change but $T_L$ increases until, with CaO = 8 mol % (FIG. 7), $T_L$ is too close to, or above, $T_W$ in all compositions for which $T_W < 1,320°C$, so there is no region suitable for commercial fiberizing.

Figure 11:
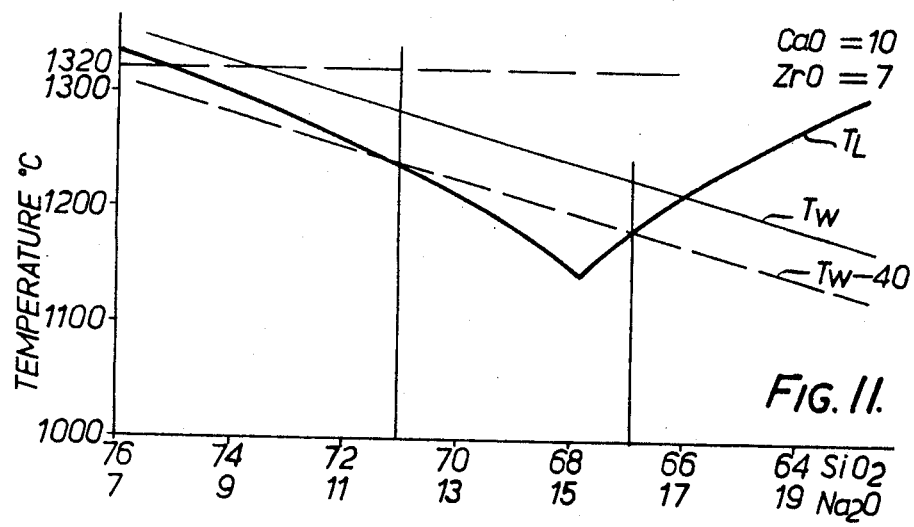

FIGS. 8 to 11 relate to glasses containing 7 mol % $ZrO_2$ and 4, 6, 8 and 10 mol % CaO in addition to $SiO_2$ and $Na_2O$. $T_W$ and $T_L$ are both considerably lower than with $ZrO_2 = 10$ mol %, and the region within which the glasses are suitable for fiberizing on a commercial scale is correspondingly larger, though the effect of increasing $T_L$ with increasing CaO can be seen to restrict this region when the CaO content rises to its maximum permissable figure of 10 mol % (FIG. 11).

Figure 12:
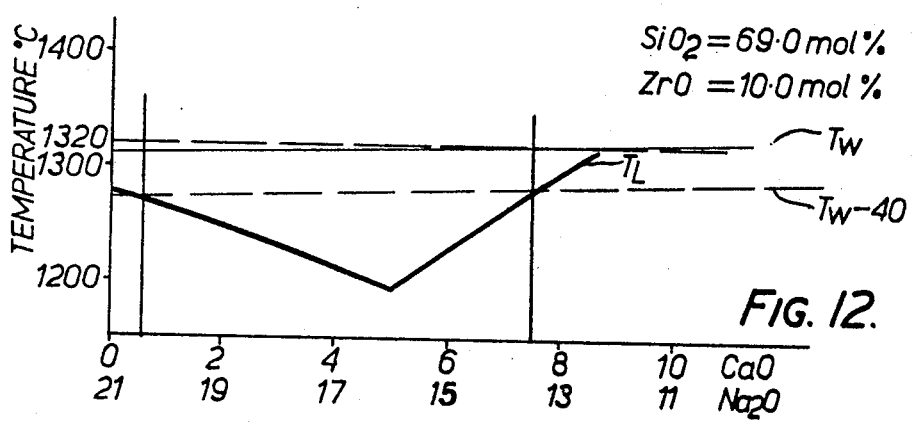
FIGS. 12 and 13 are similar graphical representations of the effect on $T_W$ and $T_L$ of inversely varying the molar proportions of CaO and $Na_2O$ in two ranges of glasses with fixed proportions of $SiO_2$ and $ZrO_2$.
Figure 13:
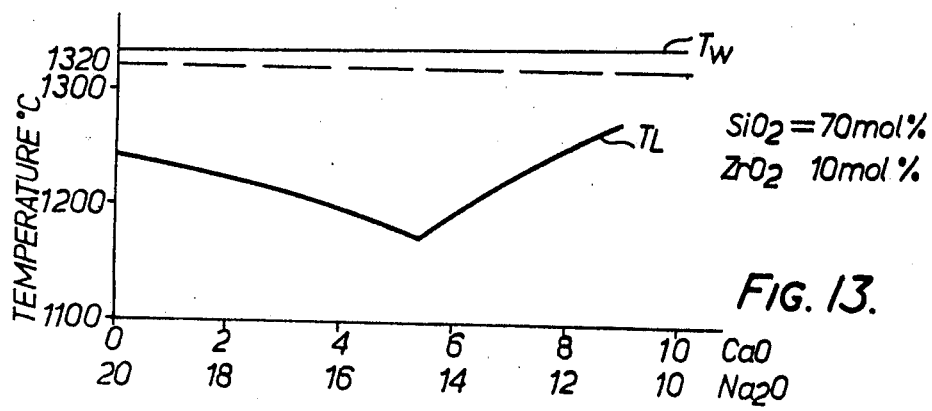

Comparison of FIGS. 8 to 11 with FIGS. 4 to 7 shows how increasing the $ZrO_2$ content reduces the region of glasses suitable for commercial fiberizing. It is found that with a $ZrO_2$ content of more than the prescribed maximum of 11 mol % there is no region of glass suitable for commercial fiberizing, because $T_W$ and $T_L$ are both too high. FIGS. 12 and 13 are graphs similar to FIGS. 4 to 11 illustrating the effect on $T_W$ and $T_L$ of inversely varying the contents of CaO and $Na_2O$ in compositions containing fixed proportions of $SiO_2$ (69 and 70 mol % respectively) and of $ZrO_2$ (10 mol %). Again the liquidus curve exhibits a minimum and in FIG. 12, with 69 mol % $SiO_2$ the presence of between 0.6 and 7.5 mol % CaO is required to ensure that $T_L < T_W - 40°C$ so that only the glasses in that region, between the two vertical lines, are suitable for commercial fiberizing. The sum of $SiO_2 + ZrO_2 + AlO_{1.5}$ is 79 mol %, which is only just below the maximum permitted figure indicated by FIG. 3, so the working temperature $T_W$ is only just below 1,320°C. In FIG. 13, with $SiO_2 = 70$ mol % and $ZrO_2 = 10$ mol % the total of $SiO_2 + ZrO_2 = 80$ mol % which is above the maximum figure indicated by FIG. 3. Hence, as would be expected from FIGS. 1 and 3, $T_W$ is always above 1,320°C and there is no region of glass suitable for commercial fiberizing.

The following Table I gives examples of glass compositions according to the invention for use in the manufacture of alkali resistant glass fibres at fiberizing temperature $T_W$ below 1,320°C. All figures are given in molecular weight percentages and the glasses are each identified as a glass with a reference 68EF. Thus the first glass in the table is glass No. 68EF55. As a result of the expression of the fluorine content in terms of $CaF_2$, glasses 68 EF69, 70 and 72 appear to contain no R'O component, but from the explanation given above it will be realised that they should be regarded as containing a molecular equivalent amount of CaO.

Table II lists the same examples as in Table I, but shows molecular weight percentages and weight percentages side-by-side.

Table I

| Glass No. 68EF | 55 | 60 | 68 | 69 | 70 | 72 | 88 | 97 | 101 |
|---|---|---|---|---|---|---|---|---|---|
| $SiO_2$ | 69 | 69 | 67 | 69 | 70 | 69 | 67 | 69 | 67 |
| $ZrO_2$ | 9.5 | 9.5 | 9.5 | 9.5 | 9.5 | 9.5 | 9.5 | 9.5 | 9.5 |
| $AlO_{1.5}$ | — | — | — | — | — | 2 | — | — | — |
| $B_2O_3$ | — | — | — | — | — | — | — | — | — |
| $FeO_{1.5}$ | — | — | — | — | — | — | — | — | — |
| $Na_2O$ | 15.5 | 17.5 | 17.5 | 15.5 | 14.5 | 17.5 | 17.5 | 17.5 | 17.5 |
| $Li_2O$ | 2 | — | — | 2 | 2 | — | — | — | — |
| CaO | 2 | 2 | 2 | — | — | — | 6 | — | — |
| ZnO | — | — | — | — | — | — | — | 4 | — |
| MnO | — | — | — | — | — | — | — | — | 6 |
| $CaF_2$ | — | — | — | 2 | 2 | 2 | — | — | — |
| $TiO_2$ | 2 | 2 | 4 | 2 | 2 | — | — | — | — |
| Fiberizing Temperature °C | 1270 | 1290 | 1295 | 1250 | 1280 | 1305 | 1270 | 1315 | 1270 |
| Liquidus Temperature °C | 1110 | 1080 | 1100 | 1075 | 1050 | 1100 | 1175 | 1140 | 1125 |

| Glass No. 68EF | 104 | 115 | 117 | 119 | 121 | 127 | 140 | 142 | 143 | 150 | 197 |
|---|---|---|---|---|---|---|---|---|---|---|---|
| $SiO_2$ | 67 | 67 | 67 | 62 | 68 | 62 | 68 | 74 | 72 | 72 | 70 |
| $ZrO_2$ | 9.5 | 9.5 | 10.5 | 10.5 | 10 | 10 | 7 | 7 | 7 | 7 | 7 |
| $AlO_{1.5}$ | — | — | — | — | — | — | — | — | — | — | — |
| $B_2O_3$ | — | — | 4 | 4 | — | 6 | — | — | — | — | — |
| $FeO_{1.5}$ | — | — | — | — | — | — | — | — | — | — | — |
| $Na_2O$ | 17.5 | 15.5 | 18.5 | 17.5 | 17 | 17 | 17 | 17 | 13 | 13 | 21 |
| $Li_2O$ | — | 2 | — | — | — | — | — | — | — | — | — |
| CaO | 3 | 6 | 4 | 6 | 5 | 5 | 8 | 2 | 8 | 6 | 2 |
| ZnO | — | — | — | — | — | — | — | — | — | — | — |
| MnO | — | — | — | — | — | — | — | — | — | — | — |
| $CaF_2$ | — | — | — | — | — | — | — | — | — | 2 | — |
| $TiO_2$ | 3 | — | — | — | — | — | — | — | — | — | — |
| Fiberizing Temperature °C | 1285 | 1265 | 1300 | 1250 | 1320 | 1210 | 1240 | 1320 | 1290 | 1275 | 1260 |
| Liquidus Temperature °C | 1170 | 1160 | 1245 | 1200 | 1220 | 1140 | 1160 | 1013 | 1155 | 1150 | 1130 |

GLASS 68EF

| Percent | Glass number | | | | | | | | | | | | | | | | | | | |
|---|---|---|---|---|---|---|---|---|---|---|---|---|---|---|---|---|---|---|---|---|
| | 55 | | 60 | | 63 | | 69 | | 70 | | 72 | | 88 | | 97 | | 101 | | 104 | |
| | M | W | M | W | M | W | M | W | M | W | M | W | M | W | M | W | M | W | M | W |
| SiO₂ | 69.0 | 62.7 | 69 | 62.1 | 67 | 60 | 69 | 62.3 | 70.0 | 63.3 | 69 | 62.3 | 67 | 60.8 | 69 | 61.7 | 67.0 | 60.8 | 67.0 | 60.1 |
| ZrO₂ | 9.5 | 17.7 | 9.5 | 17.5 | 9.5 | 17.4 | 9.5 | 17.6 | 9.5 | 17.6 | 9.5 | 17.6 | 9.5 | 17.7 | 9.5 | 17.4 | 9.5 | 17.7 | 9.5 | 17.5 |
| AlO₁.₅ | | | | | | | | | | | 2.0 | 1.6 | | | | | | | | |
| P₂O₃ | | | | | | | | | | | | | | | | | | | | |
| FeO₁.₅ | | | | | | | | | | | | | | | | | | | | |
| Na₂O | 15.5 | 14.5 | 17.5 | 16.3 | 17.5 | 16.2 | 15.5 | 14.5 | 14.5 | 13.5 | 17.5 | 16.4 | 17.5 | 16.4 | 17.5 | 16.1 | 17.5 | 16.5 | 17.5 | 16.5 |
| Li₂O | 2.0 | 0.9 | | | | | 2.0 | 0.9 | 2.0 | 0.9 | | | | | | | | | | |
| CaO | 2.0 | 1.8 | 2.0 | 1.7 | 2.0 | 1.7 | 2.0 | 1.8 | | | | | 6.0 | 5.1 | | | | | 3.0 | 2.5 |
| ZnO | | | | | | | | | | | | | 4.0 | 4.8 | | | | | | |
| MnO | | | | | | | | | | | | | | | 6.0 | 5.0 | | | | |
| CaF₂ | | | | | | | 2.0 | 2.3 | 2.0 | 2.3 | 2.0 | 2.3 | | | | | | | | |
| TiO₂ | 2.0 | 2.4 | 2.0 | 2.4 | 4.0 | 4.8 | | | 2.0 | 2.4 | | | | | | | | | 3.0 | 3.6 |

| Percent | Glass number | | | | | | | | | | | | | | | | | | | |
|---|---|---|---|---|---|---|---|---|---|---|---|---|---|---|---|---|---|---|---|---|
| | 115 | | 117 | | 119 | | 121 | | 127 | | 140 | | 142 | | 143 | | 150 | | 197 | |
| | M | W | M | W | M | W | M | W | M | W | M | W | M | W | M | W | M | W | M | W |
| SiO₂ | 67.0 | 61.4 | 67 | 60.1 | 63.0 | 56.6 | 68 | 61.3 | 62 | 55.5 | 68.0 | 63.3 | 74.0 | 68.7 | 72.0 | 67.1 | 72.0 | 66.7 | 70 | 64.9 |
| ZrO₂ | 9.5 | 17.9 | 10.5 | 19.3 | 10.5 | 19.7 | 10.0 | 18.5 | 10 | 18.4 | 7.0 | 13.4 | 7.0 | 13.3 | 7.0 | 13.4 | 7.0 | 13.3 | 7 | 13.2 |
| AlO₁.₅ | | | | | | | | | | | | | | | | | | | | |
| B₂O₃ | | | | | 4.0 | 2.1 | | | 6 | 3.1 | | | | | | | | | | |
| FeO₃ | | | | | | | | | | | | | | | | | | | | |
| Na₂O | 15.5 | 14.7 | 18.5 | 17.1 | 17.5 | 16.5 | 17.0 | 15.9 | 17 | 15.7 | 17.0 | 16.4 | 17.0 | 16.3 | 13.0 | 12.5 | 13.0 | 12.4 | 21 | 20.2 |
| Li₂O | 2.0 | 0.9 | | | | | | | | | | | | | | | | | | |
| CaO | 6.0 | 5.1 | 4.0 | 3.4 | 6.0 | 5.1 | 5.0 | 4.2 | 5 | 4.2 | 8.0 | 7.0 | 2.0 | 1.7 | 8.0 | 7.0 | 6.0 | 5.2 | 2 | 1.7 |
| ZnO | | | | | | | | | | | | | | | | | | | | |
| MnO | | | | | | | | | | | | | | | | | | | | |
| CaF₂ | | | | | | | | | | | | | | | | | 2.0 | 2.4 | | |
| TiO₂ | | | | | | | | | | | | | | | | | | | | |

In each of these examples, it will be seen that the fiberizing temperature is not greater than 1,320°C and lies within the range 1,210°C to 1,320°C, while the liquidus temperature is in each case more than 40° lower than the fiberizing temperature.

It will be seen that the alkali metal (R₂O) constituents of the glasses are limited to Na₂O and small amounts of Li₂O. K₂O is avoided because it tends to make the glass more viscous, and with high contents of ZrO₂ the viscosity is already high enough to make any increase undesirable, from the point of view of commercial fiberizing. Tests have also indicated that replacement of part of the Na₂O by K₂O can reduce the alkali resistance of the glass.

In addition to the major components of the glass composition, certain other oxides may be added in quantities up to 5 mol % with no detrimental effect on the production of fibres from the glass nor in the alkali resistance of the fibres. Such oxides include B₂O₃, Fe₂O₃ and TiO₂ already specified.

Common impurities may also be present in a proportion of up to 1 mol %. Further oxides may be included in proportions of up to 1 mol % to assist in refining of the glass. Such oxides are for example P₂O₅, Cr₂O₃, As₂O₃, CdO, BeO and V₂O₅.

Figure 14:
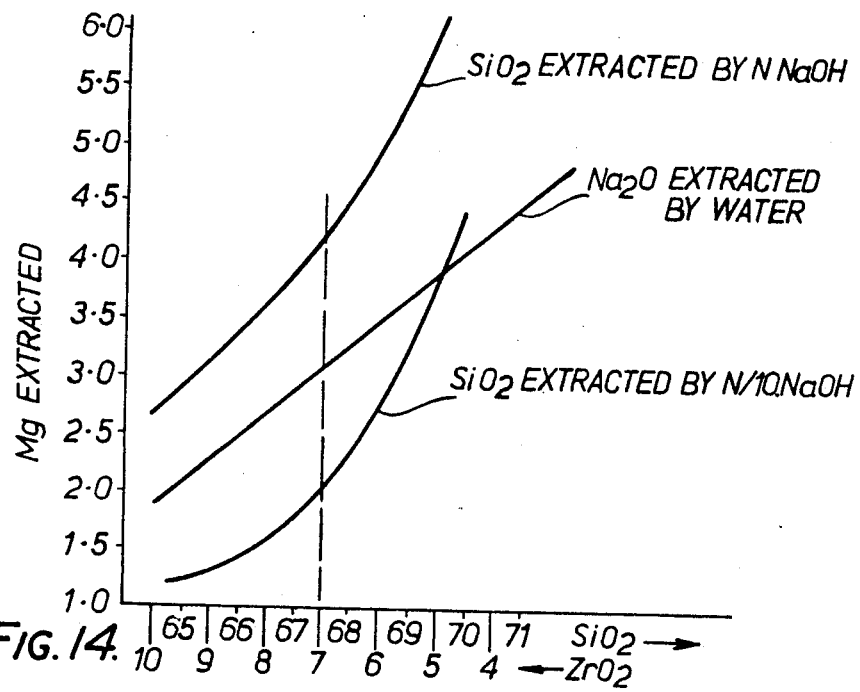

FIG. 14 shows the results of tests made to ascertain the resistance to alkali and to water of a series of glass compositions with varying contents of ZrO₂. In all of these compositions, SiO₂ + ZrO₂ = 74.5 mol %, Na₂O = 17.5 mol % and CaO = 8 mol %. The three curves respectively represent the amount of SiO₂ extracted by 50 cc. of a normal solution of sodium hydroxide from 10 gm of a crushed sample of the glass in an autoclave in 30 minutes, the amount of SiO₂ extracted by 50 cc. of an N/10 solution of NaOH in the same time from a similar sample, and the amount of Na₂O extracted by 50 cc. of water in the same time from a similar sample. It will be seen that the amounts of SiO₂ extracted by the alkali (NaOH) and the amount of Na₂O extracted by water are reduced to relatively low values as the ZrO₂ content is increased above 7 mol %.

Figure 15:
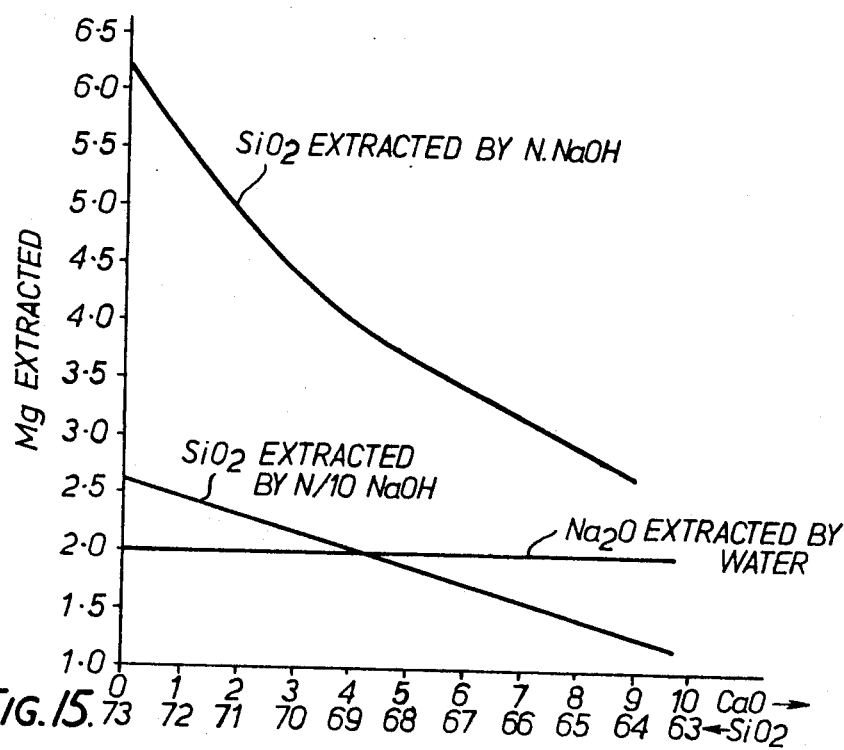
FIG. 15 is a similar representation of the results of similar experiments on glasses with varying CaO content.

FIG. 15 illustrates the results of similar tests on a series of glass compositions with varying CaO content. In these compositions, SiO₂ + CaO = 73 mol %, ZrO₂ = 9.5 mol % and Na₂O = 17.5 mol %. It will be seen that increasing the CaO content improves the resistance of the glass to the alkali but does not substantially alter its resistance to water. The beneficial effect of CaO is noticeable with only 1 mol % but it is clearly preferable to use at least 2 mol %. Similar effects are found with other alkaline earth oxides, or with ZnO or MnO.

The treatment with NaOH carried out in the above experiments is of course a more severe test than would be experienced by the glass fibres in practice in cement, in which the alkali content is mainly CaO or Ca(OH)₂ which is not as strong an alkali as NaOH, but the results of the experiments afford a guide to the results to be expected in cement over a period of years.

The incorporation of the glass fibres into a cementitious mix can be effected by a spray-up technique or by premixing.

The spray-up technique can be used in the formation of large boards. In this technique, a cement slurry and chopped glass fibres are sprayed on to a paper covered perforated face of a suction mould. The mould is provided with adjustable screed boards round its edges thus allowing sheets of various thicknesses to be manufactured. After spraying to get a desired thickness, the top surface is levelled, and excess water removed by the application of suction. The sheet can then be transferred to a support by inverting the mould, and is then covered and stored until the desired curing time has passed, whereupon the board is ready for use. The water/cement ratio of the slurry is chosen according to the nature of the cement used. The glass fibre is fed as a roving to a chopper, and the length of the chopped material can be adjusted by varying the number of blades in the chopper. The glass to cement ratio is controlled by altering the number of rovings fed into the chopper at the same chopping rate, or by varying the speed of the chopper.

The technique can be used either to produce single boards by having a stationary mould and moving the spray heads from side to side and along the mould. In a continuous production unit, a fixed multi-head unit can be arranged to spray on to a moving belt forming the mould surface.

This technique has been used to obtain the necessary samples for storage testing. Boards 1.5m × 1.0m were made using Portland cement and 34 mm length chopped strands of the glass fibre. The materials were sprayed to a thickness of 10 to 13 mm, with a glass content of about 5%, and a water/cement ratio of the order of 0.3 to 0.4. All boards were cured for seven days in water. The Portland cement was found on analysis to contain over 65% by weight CaO as well as small quantities of other alkalis.

The modulus of rupture, tensile strength and impact strength of such boards were tested both initially and after immersion for a period of seven days in water. Further tests were made after storage in air, storage in water and weathering, after varying periods of up to 2 years, and the boards were found to retain a much higher proportion of their original properties than similar boards made with reinforcement of known glass fibres, such as E-glass.

In addition to methods involving the simultaneous spraying of glass fibre and cement slurries on to a suction mould, composites may be produced by the premixing technique. It is difficult to mix glass fibres of a reasonable length with cement without the fibre balling up and forming lumps. However, if the fibres prior to mixing with cement are brought into contact with a friction reducing substance such as a polyethylene oxide polymer, a lump-free mix can be obtained. One suitable form of polyethylene oxide is the material available under the trade name Poly-ox WSR 301 (Union Carbide). The glass fibres to be incorporated into a cement matrix are added to a solution containing the friction reducing substance, and agitated with a mechanical mixer, and then either added to cement, or cement added thereto in a conventional concrete mixer, such as a pan mixer. After 3 or 4 minutes mixing, the glass fibres are dispersed in the matrix, and the resulting mixture can be cast, moulded or extruded to form shaped objects. Using the pre-mixing technique it is possible to mix as much as 10% by weight glass fibre into a cement matrix, whereas it is difficult to exceed 2% where glass fibres are added to a mix in small amounts without any prior treatment. Other conventional additives can be added to the mix to assist incorporation, or to improve the properties of the final matrix. These include materials such as natural and synthetic rubber latices.

Using a technique of spraying a mixture of glass fibres and cement, decorative and fire resistant finishes can be obtained. A further method of producing shaped products is by taking an uncured sheet from the suction mould, and forming it over a mould into a profiled sheet or shell section.

The glass fibres of the present invention can be used advantageously in any cement matrix in which the fibre is in a strongly akaline environment when incorporated into the matrix. The fibres can also be used in high alumina cement to give a longer life to products, as although the attack on non-durable glass fibres is not as great in high alumina cement as inn ordinary Portland cement, it does take place.

The quantity of glass fibre required in the matrix will vary according to the dimensions of the filaments making up the strands, and the number of filaments present in the strands, the length to which the fibre is chopped, and the properties desired in the finished product. It is thus not possible to state a definite range of glass fibre contents but in general, on economic grounds, the amount of glass fibre incorporated is unlikely to be greater than 10% by weight, nor less than about 2% by weight. The calculation of the amount required of any particular fibre is easily made once the characteristics desired in the final product are known.

The glass compositions according to the invention thus permit a commercially economic process to be employed for the production of glass fibres to be used in reinforcing cementitious products and the reinforced cement or concrete so produced has a long life because of the improved resistance to attack by the alkalis in the wet cement, particularly calcium hydroxide.

We claim:

1. Glass fibres of the continuous type which are to be incorporated as reinforcement in cementitious products, and having a composition consisting essentially of, in molecular weight percentages:

| | |
|---|---|
| $SiO_2$ | 62% to 75% |
| $ZrO_2$ | 7% to 11% |
| $R_2O$ | 13% to 21% |
| $R'O$ | 1% to 10% |
| $Al_2O_3$ | 0% to 4% |
| $B_2O_3$ | 0% to 6% |
| $Fe_2O_3$ | 0% to 5% |
| $CaF_2$ | 0% to 2% |
| $TiO_2$ | 0% to 4% | wherein $R_2O$ represents $Na_2O$ and up to 2 mol % $Li_2O$, and R'O is an oxide selected from the group consisting of the alkaline earth metal oxides, zinc oxide (ZnO) and manganous oxide (MnO), and wherein the maximum value of the molecular weight percentage represented by $SiO_2 + ZrO_2 + AlO_{1.5}$ is on a sliding scale dependent on the content of $ZrO_2$, ranging in the absence of $Li_2O$ and $CaF_2$ between 78.5% when $ZrO_2$ is 11% and 81% when $ZrO_2$ is 7%, and being increased over the whole scale by 1.5% when 2% $Li_2O$ is present and being further increased over the whole scale by 2% when 2% $CaF_2$ is present, the composition also being such that the liquidus temperature $T_L$ is more than 40°C below the temperature $T_W$ at which the glass viscosity is 1,000 poises, $T_W$ being not higher than 1,320°C.

2. Glass fibres according to claim 1, wherein the R'O content consists of from 2% to 8% CaO.

3. Glass fibres according to claim 1, consisting of, in molecular weight percentages:

| | |
|---|---|
| $SiO_2$ | 69% to 70% |
| $ZrO_2$ | 9.5% |
| $Na_2O$ | 14.5% to 15.5% |
| $Li_2O$ | 2% |
| CaO | 2% |
| $CaF_2$ | 0% to 1% |
| $TiO_2$ | 2%. |

4. Glass fibres of the continuous type which are to be incorporated as reinforcement in cementitious products, and having a composition consisting of, in molecular weight percentages:

| | |
|---|---|
| $SiO_2$ | 62% to 75% |
| $ZrO_2$ | 7% to 11% |
| $R_2O$ | 13% to 21% |
| $R'O$ | 1% to 10% |
| $Al_2O_3$ | 0% to 4% |
| $B_2O_3$ | 0% to 6% |
| $Fe_2O_3$ | 0% to 5% |
| $CaF_2$ | 0% to 2% |
| $TiO_2$ | 0% to 4% | wherein $R_2O$ represents $Na_2O$ and up to 2 mol % $Li_2O$, R'O is an oxide selected from the group consisting of the alkaline earth metal oxides, zinc oxide (ZnO) and manganous oxide (MnO), and wherein the composition is so selected that the temperature $T_W$ at which the glass viscosity is 1,000 poises is not higher than 1,320°C and the liquidus temperature $T_L$ is more than 40°C below $T_W$.

* * * * *